(12) United States Patent
Nishimura

(10) Patent No.: US 7,873,248 B2
(45) Date of Patent: Jan. 18, 2011

(54) FERRULE FOR OPTICAL CONNECTOR

(75) Inventor: Akito Nishimura, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/260,760

(22) Filed: Oct. 29, 2008

(65) Prior Publication Data

US 2010/0104245 A1 Apr. 29, 2010

(51) Int. Cl.
G02B 6/26 (2006.01)
G02B 6/42 (2006.01)
G02B 6/00 (2006.01)

(52) U.S. Cl. .......................... 385/51; 385/147
(58) Field of Classification Search .............. 385/60, 385/71, 78, 83; 264/1.25
See application file for complete search history.

(56) References Cited

U.S. PATENT DOCUMENTS 6,287,017 B1 * 9/2001 Katsura et al. ............... 385/59
6,340,247 B1 * 1/2002 Sakurai et al. ............... 385/78
6,718,099 B2 * 4/2004 Chivers ........................ 385/52
7,261,469 B1 * 8/2007 Dean et al. ................... 385/60
2005/0036742 A1 * 2/2005 Dean et al. ................... 385/71

FOREIGN PATENT DOCUMENTS

| JP | 08-292342 | * 11/1996 |
|---|---|---|
| JP | 9-178980 A | 7/1997 |
| JP | 9-184942 A | 7/1997 |
| JP | 10-170764 A | 6/1998 |
| JP | 2000-284150 A | 10/2000 |
| JP | 2002-156560 A | 5/2002 |
| JP | 2002-357738 A | 12/2002 |
| JP | 2003-066280 A | 3/2003 |
| JP | 2007-286354 A | 11/2007 |

* cited by examiner

Primary Examiner—Akm E Ullah
(74) Attorney, Agent, or Firm—Sughrue Mion, PLLC

(57) ABSTRACT

A ferrule includes a recess formed on an obliquely polished surface to house a protrusion formed on an obliquely polished surface of another ferrule, so as to avoid an angular change at an interface between end surfaces of the pair of obliquely polished end surfaces of the ferrules facing each other.

4 Claims, 3 Drawing Sheets

FERRULE FOR OPTICAL CONNECTOR

BACKGROUND OF THE INVENTION

1. Field of the Invention

The present invention relates to a ferrule for an optical connector for connecting multiple optical fibers in a lump, and more specifically to a ferrule for an optical connector including a ferrule end surface which is obliquely polished.

2. Description of the Related Art

Mechanically transferrable (MT) connectors and multifiber push-on (MPO) connectors have been known as examples of optical connectors each including a multicore optical fiber and used to connect optical fiber ribbons and the like.

MT connectors are disclosed in Japanese Patent Application Publication No. Hei 9-178980 and in Japanese Patent Application Publication No. Hei 9-184942. In these MT connectors, optical fibers respectively fixed to ferrules are disposed so as to face each other and these fibers are precisely positioned by way of two guide pins. Moreover, a certain pressure is applied to both of the ferrules through a clamp spring or the like and a stable connection state is retained by maintaining this pressure.

An MPO connector has been disclosed in Japanese Patent Application Publication No. Hei 10-170764. This MPO connector does not require any matching agents or tools which are necessary for the MT connectors and thus is easily attachable or detachable by a single touch.

Each of the MT connectors and the MPO connector includes ferrules as main constituents for fixing leading-edge portions at ends of respective optical fibers. A pair of ferrules are disposed so as to face each other, and each of the ferrules is pressurized from its rear end toward its front end surface by use of either an external clamp spring which is mounted thereon or a spring previously contained in a connector housing.

A front end surface of each of the ferrules is obliquely polished at an angle of approximately 8 degrees. When the ferrules are aligned so that each two adjacent obliquely polished surfaces abut on each other, the center lines of the ferrules are arranged in a straight line.

When the optical fibers are thus brought into contact in a manner that each adjacent two obliquely polished surfaces abut on each other, physical contact (PC) connection that suppresses an increase of a connection loss due to Fresnel reflection is established without using a refractive index matching agent.

The ferrules are formed of polyphenylene sulfide (PPS) resin or epoxy resin.

SUMMARY OF THE INVENTION

FIGS. 1 and 2 show a state of the above-described conventional ferrules 1 and 1 in the PC connection. When obliquely polished end surfaces 1a of the ferrules 1 and 1 facing each other are pressurized in axial directions F with springs (not shown) for pressurization, the ferrules 1 and 1 facing each other mutually slide in directions indicated with arrows S along the oblique surfaces due to a clearance between a guide pin P and a guide-pin guide hole 2, thereby causing axial misalignment. Accordingly, a shear stress occurs between the guide pin P and an edge of the guide-pin guide hole 2. If this stress occurs repeatedly, a bump Q protruded by plastic deformation of the edge of the guide hole 2 is formed as a consequence.

This bump Q pressurizes the end surface of the facing ferrule, whereby a minute clearance is formed between the obliquely polished surfaces that had been closely attached to each other. As a result, the physical contact (PC) connection will be obstructed.

An aspect of the present invention provides a ferrule for an optical connector which includes an obliquely polished front end surface, a guide-pin guide hole formed in a longitudinal direction from the front end surface, and a recess formed at an edge of the guide-pin guide hole on the front end surface. Here, the front end surface establishes close contact with an obliquely polished front end surface of another ferrule and the contact is retained by pressurization.

According to the present invention, when a bump protruded in a space between the guide pin and the edge of the guide-pin guide hole, the bump is housed inside the recess. Therefore, this bump will not obstruct PC connection.

DETAILED DESCRIPTION OF THE PREFERRED EMBODIMENTS

First Embodiment

Figure 1:
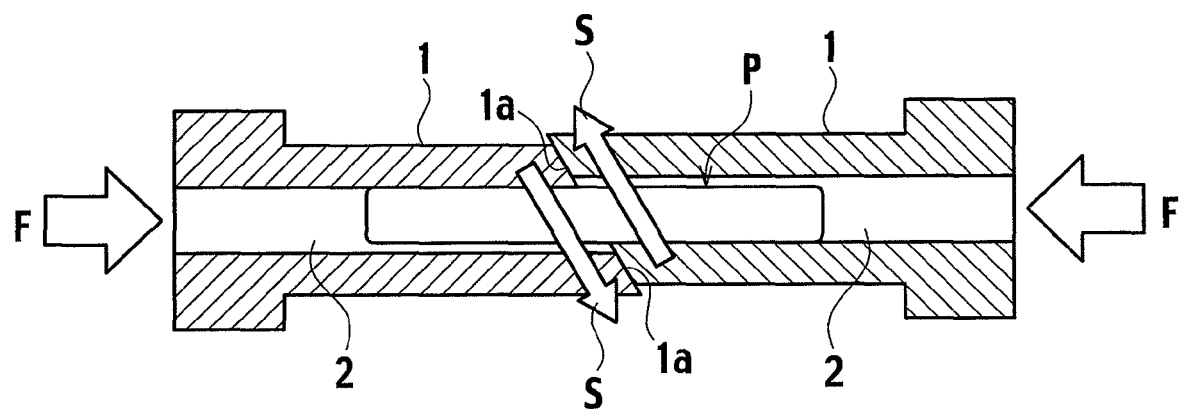
FIG. 1 is a vertical cross-sectional view showing a state of application of conventional ferrules for optical fibers.
Figure 2:
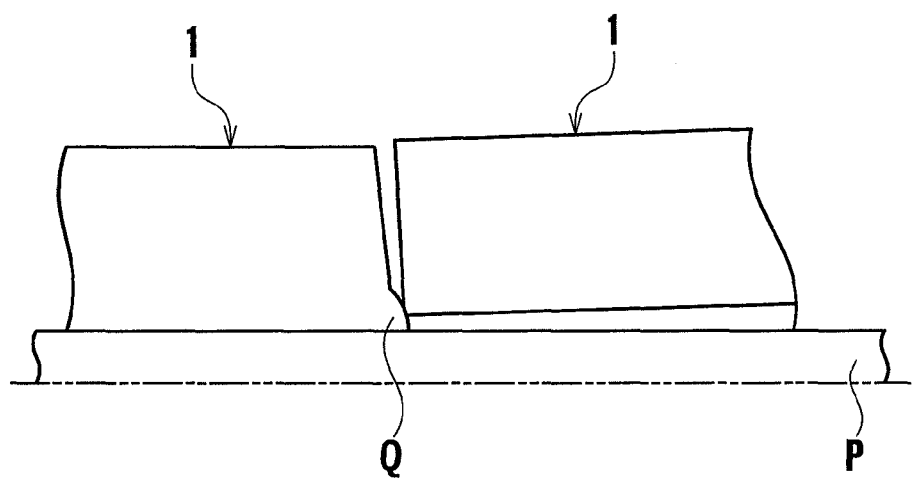
FIG. 2 is another vertical cross-sectional view showing the state of application of the conventional ferrules for optical fibers.
Figure 3:
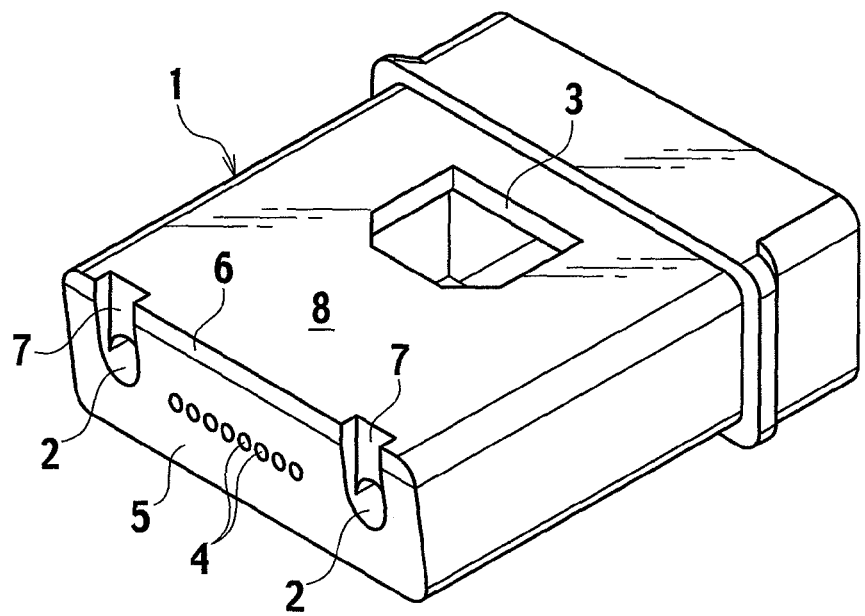
FIG. 3 is a perspective view showing a first embodiment of the present invention.

FIG. 3 shows a first embodiment of the present invention.

A ferrule 1 includes guide-pin guide holes 2 formed so as to penetrate a side edge of the ferrule from the front end surface of the side edge, an adhesive filling hole 3 formed in an upper surface of the ferrule 1, multiple insertion holes 4 being communicated with this adhesive filling hole 3 and allowing insertion of front ends of optical fibers, and an obliquely polished surface 5 as well as a non-obliquely polished surface 6 both of which are formed on the front end surface of the ferrule 1.

Specifically, near an entrance of each guide-pin guide hole 2, a recess 7 communicated with this entrance is formed. The recess 7 is formed into a groove shape along the obliquely polished surface 5, and this groove-shaped recess 7 is formed to reach an upper surface 8 of the ferrule 1.

To be more specific, the groove-shaped recess 7 is formed so as to extend toward the non-obliquely polished surface 6 and reach the upper surface 8 of the ferrule 1. Comparing with a case where the groove-shaped recess is formed toward an obliquely polished surface side (a side opposite to the side where non-obliquely polished surface 6 is formed), this structure prevents a depth of the recess 7 from being shallow because of the inclination.

Moreover, the groove-shaped recess 7 preferably has a width equal to or greater than a diameter of each of the guide-pin guide holes 2.

Figure 5:
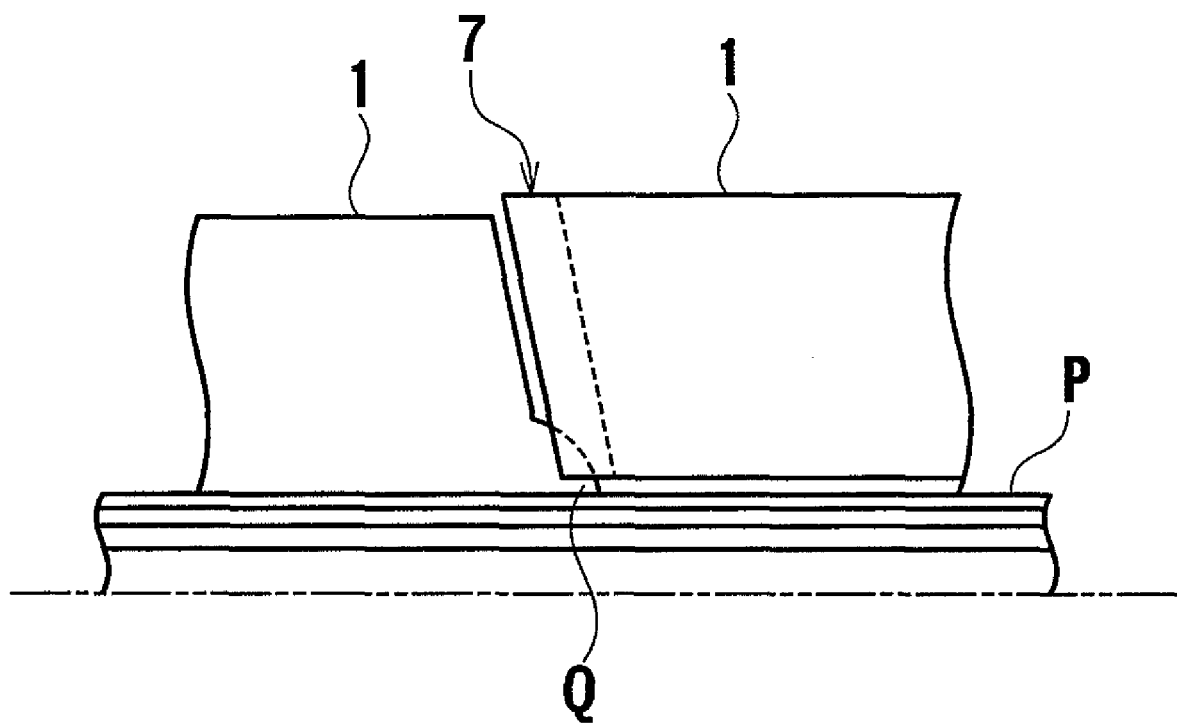
FIG. 5 is a vertical cross-sectional view showing a state of application of the present invention.

Operations and effects of this invention will now be described with reference to FIG. 5. A pair of ferrules 1 and 1 are held by pressurization toward each other by use of pressurizing means (not shown) such as a clamp spring or the like. When the ferrules 1 and 1 are held by pressurization, the obliquely polished surfaces 5 slide relatively to each other along the oblique surfaces. As a result, a shear stress occurs in the vicinity of an edge of the guide-pin guide hole 2, which is in contact with a guide pin P. If this stress occurs repeatedly, a bump Q may be formed due to plastic deformation. In this case, the recess 7 formed at the edge of the guide-pin guide hole 2 on the obliquely polished surface 5 on the opponent side will house this bump Q. Therefore, the bump Q will not pressurize the obliquely polished surface 5 on the opponent side and change a position thereof.

In other words, since the recess 7 houses the bump Q, a minute clearance will not be formed between the ferrules 1 and 1 by pressurizing the obliquely polished surface 5 of the opponent ferrule. Therefore, PC contact will not be obstructed.

Second Embodiment

Figure 4:
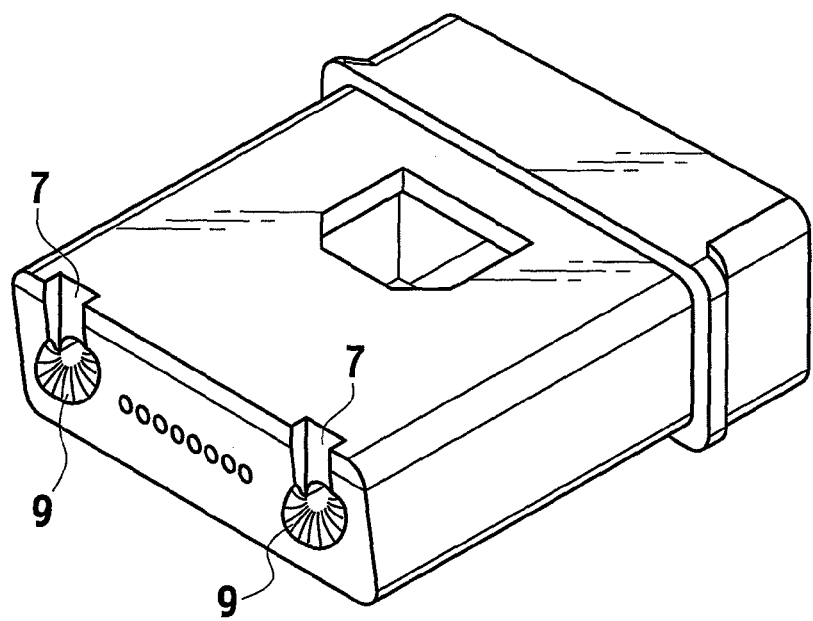
FIG. 4 is a perspective view showing a second embodiment of the present invention.

In the first embodiment, an end of each of the recesses 7 itself is simply extended to the upper surface 8 of the ferrule 1. Alternatively, in a second embodiment, a taper portion 9 is first formed around each of the guide-pin guide holes 2 as shown in FIG. 4, and another groove can be formed continuously to this taper portion 9. By forming the recess into a taper, it is possible to prevent a cracked resin formed at the time of connecting or disconnecting a joint pin from protruding toward a contact edge surface and thereby adversely affecting optical connection.

Each of the groove-shaped recesses 7 illustrated in FIG. 3 and FIG. 4 is extended until reaching the upper surface 8 of the ferrule. Instead, the recess may be extended halfway before reaching the upper surface 8 of the ferrule.

INDUSTRIAL APPLICABILITY

The present invention is applicable to a ferrule for an MT connector and to a ferrule for a MPO connector. Moreover, an array of the insertion holes 4 for optical fibers formed on the front end surface is not limited only to a single row. The invention is also applicable to a structure including multiple rows of the insertion holes.

What is claimed is:

1. A ferrule for an optical connector comprising:
    an inclined, obliquely polished front end surface which is a contact surface which establishes contact with an obliquely polished front end surface of another ferrule;
    a guide-pin hole formed in a longitudinal direction of the ferrule from the front end surface; and
    a recess comprising a groove formed in an edge of the guide-pin hole on the front end surface,
    wherein an upper surface of the ferrule extends further than a bottom surface of the ferrule by inclination of the front end surface, and the groove extends from an edge of the guide pin hole to the upper surface of the ferrule.

2. The ferrule for an optical connector according to claim 1, wherein the front end surface of the ferrule comprises a non-obliquely polished surface formed an edge of the front end surface adjacent to the upper surface, and the groove extends from the edge of the guide-pin hole into the non-obliquely polished surface.

3. The ferrule for an optical connector according to claim 1, wherein a width of the recess is equal to or greater than a diameter of the guide-pin hole.

4. The ferrule for an optical connector according to claim 1, wherein the recess further comprises a taper portion.

* * * * *